United States Patent Office 3,529,645
Patented Sept. 22, 1970

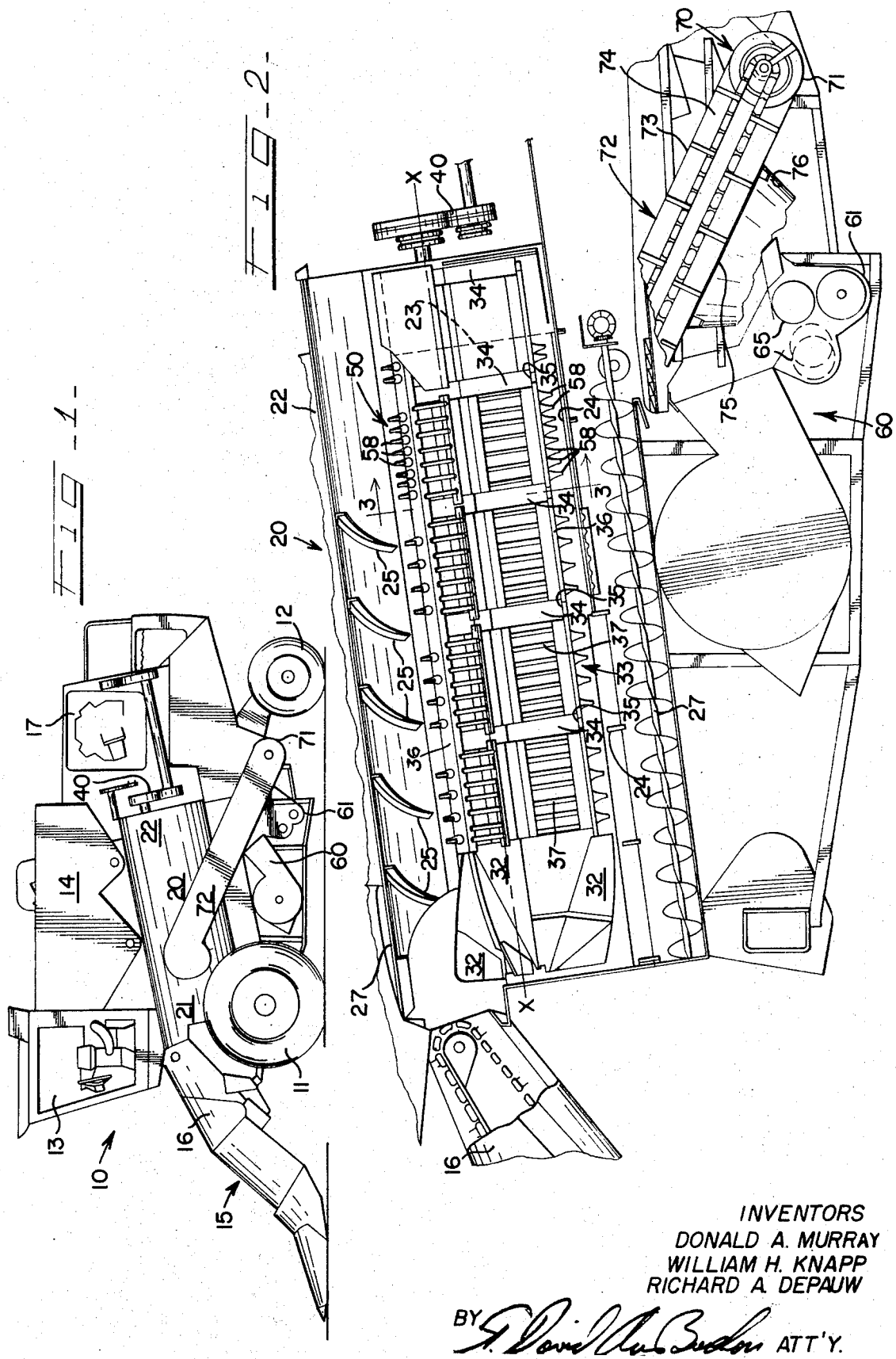

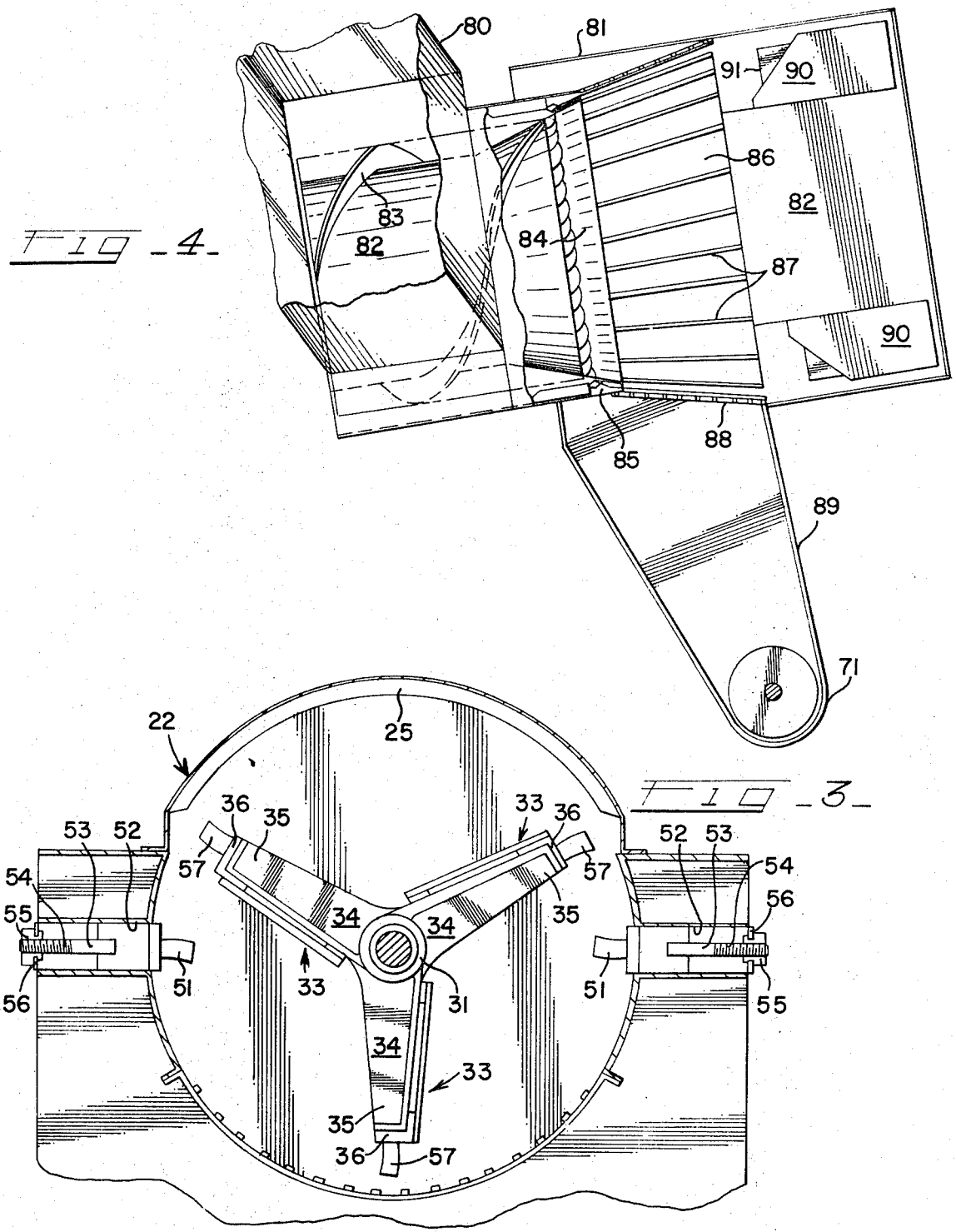

3,529,645
AXIAL-FLOW SHELLER AND GRINDER COMBINE
Donald A. Murray, Bettendorf, and William H. Knapp, Davenport, Iowa, and Richard A. De Pauw, East Moline, Ill., assignors to International Harvester Company, Chicago, Ill.
Filed Sept. 24, 1968, Ser. No. 762,000
Int. Cl. A01f *12/22, 11/06*
U.S. Cl. 146—71   10 Claims

ABSTRACT OF THE DISCLOSURE

An axial flow combine having a grain cracking device and a cob grinding mill arranged such that after the grain has been threshed and cleaned, it is then cracked to a desired size and after the grain has been removed from the cobs, the cobs are processed through the mill and a classified portion of the ground cobs are then mixed with the cracked grain. The cob grinding mill and the grain cracking device are independently adjustable so that numerous combinations of aggregate can be selected.

BACKGROUND OF THE INVENTION

Field of the invention

The present invention relates generally to harvesting machines and the like and more particularly to a new and improved axial flow combine having means for cracking the grain, grinding the cobs and mixing the cracked grain and ground cobs into an aggregate of selected proportions.

Description of the prior art

In all present commerically available combines, the material to be threshed in fed between a rotary cylinder and a stationary concave in a direction normal to the axis of the rotating cylinder. Much of the grain contained in the material fed to the cylinder and concave passes through the concave as threshed grain. The remainder of the material is conveyed to the separaing components of the combine which is conventional combines includes reciprocating or oscillating straw racks, return pans and chaffer sieves. This specific invention concerns a combine that operates on a completely different principle than the above described commerically available combines. In the combine described in the subject application, an elongated rotor is provided along the longitudinal axis of the combine. The elongated rotor is enclosed within a cylinder having transport fins provided along its internal upper surface and a concave and grate provided along its lower surface. The material to be threshed is fed into the front end of the cylinder and is metered axially towards the rear end for processing by the cooperating elements of the rotor and cylinder. An axial flow type combine such as this has the obvious advantage over conventional combines in the simplicity of its drive since it utilizes only simple rotary drives and does not include oscillatng or reciprocating elements. This not only simplifies the drives for the separating section but also reduces vibrations considerably. Furthermore, the elements of an axial flow type separating section have better structural stability than those of conventional separating sections and are thus more durable and reliable. In axial flow combines, the threshing and separating are both performed within the cylinder through the action of the rotor. In so constructing the threshing and separating section of the combine, there is only one moving part in these sections, the rotor. The drive for rotating the rotor is obviously much simpler than the several drivers required in the threshing and separating sections of conventional combines. A more complete disclosure of axial flow combines of the type described above can be found in the copending patent applications of Rowland-Hill et al. Ser. No. 576,151, filed Aug. 30, 1966, now Pat. No. 3,481,342 and Knapp et al. Ser. No. 584,054, filed on Sept. 29, 1966, now abandoned.

Combines including the above described axial flow type are used to harvest various grains including corn. In harvesting corn, the clean kernels are collected in the grain tank and the stalks, cobs and husks are discharged to the ground as trash. There is, however, food value in the cobs and a standard cattle feed comprises a mixture of ground cobs and kernels of corn. In mixtures of this type, the ratio of grain to cob and the size of the cob particles is critical, also the grain is sometimes cracked to reduce its size and aid digestion. For this reason it would be advantageous if a combine had the ability to retain the corn cobs as well as the kernels and the further ability to independently process the kernels and cobs and then mix them in selected proportions. There have now been devices developed that can produce in the field a mixed feed of cracked grain and ground cobs. Reference is hereby made to the patents to Barkstrom et al. No. 3,348,780 of Oct. 24, 1967 and Johnson No. 3,384,138 of May 21, 1968. Both of the above prior art patents disclose components for tractor mounted corn harvesters. A tractor mounted corn harvester is built around and powered by a conventional farm tractor whereas a combine is a self-supporting machine that can be either self-propelled or towed by a tractor. Reference may be made to the patent to Barkstrom et al. No. 3,320,730 of May 23, 1967 for a complete disclosure of a tractor mounted corn harvester. Since the above referred to patents to Barkstrom et al. No. 3,348,780 and Johnson No. 3,348,138 were developed for tractor mounted corn harvesters, they are not structurally adaptable for use on combines.

SUMMARY

Axial flow combines because of their rugged construction are better adapted to handle the large quantity of heavy trash encountered in corn harvesting than are conventional combines. Because of this inherent advantage in harvesting corn, research efforts have been directed to the further development of this machine's corn harvesting potential. This invention provides the axial flow combine with the capability to process in the field concurrently with the harvesting operation a mixed feed made up of ground cobs an dcracked kernels at any selected ratio. This is a substantial advancement over conventional combines that have an end product of clean grain which then must be further processed if a mixed feed is desired. The subject invention widens the potential of the axial flow combine such that its end product can be selected from the set containing whole kernels and any mixture of cracked kernels and ground cobs. This potential has been built into the axial flow combine's existing structure without adversely affecting its ability to handle other crops.

BRIEF DESCRIPTION OF THE DRAWINGS

FIG. 1 is a side view of an axial flow combine;

FIG. 2 is a side view of the platform, tubular casing, cleaning system and tailing elevator having portions broken away to show the internal parts of these components;

FIG. 3 is a cross sectional view of the tubular casing taken along lines 3—3 of FIG. 2; and FIG. 4 is a side view having portions cut away of a second embodiment of the cob grinding mill.

DESCRIPTION OF THE PREFERRED EMBODIMENTS

Referring now to the drawings wherein like reference characters designate like or corresponding parts throughout the several views, there is shown in FIG. 1 an axial flow combine designated 10 having drive wheels 11, steerable wheels 12, an operator's cab 13, a grain tank 14, a platform 15 having a feeder 16, a tubular casing 20, a tailing elevator 72, a cleaning system 60 and an engine 17. The material movement through the axial flow combine can best be described by a reference to FIGS. 1 and 2. The material is gathered from the field by the platform 15 and fed upwardly through the platform feeder 16 where it is deposited into the tubular casing 20 through an opening formed in the forward end 21. The material moves from the forward end 21 towards the rear end portion 22 of the tubular casing. During this movement, threshing and separation occurs. The threshed and separated material passes through the bottom portion 24 of the tubular casing and is fed by the conveying means 27 to the cleaning system 60. Material that fails to pass through the cleaning system 60 is collected by the tailing means 70 which in a conventional combine functions to return the tailing to the tubular casing for reprocessing. As shall be further described, the tailing means of the subject invention serves an additional function. The final product is collected in the clean grain trough 61 and raised by an elevator where it is deposited into the grain tank 14. Material that does not pass through the bottom portion 24 of the tubular casing is discharged through a discharge opening 23. Normally, the discharge opening 23 is vented to the atmosphere and the discharged material falls to the field. However, as shall be further described in the second embodiment of the subject invention, material discharged through the discharge opening 23 is directed to a cob grinding mill for additional processing.

Referring now to FIG. 2, the tubular casing 20 is formed about a fore-and-aft axis designated X—X and has a forward end 21 and a rear end portion 22. A discharge opening 23 is formed in the rear end portion 22. The bottom portion or lower surface 24 of the tubular casing is in the form of a concave or grate that will permit the passage of selective material therethrough. The concave and grate are removable so that optimum designed concaves and grates can be used for the various crops. Spiral transport fins 25 are secured to the upper internal surface 26 of the tubular casing and function to index the material rearwardly during processing.

The elongated rotor is rotatably supported about its core 31 along the fore-and-aft axis X—X. The elongated rotor has a forward end corresponding to the forward end 21 of the tubular casing and a rear end portion corresponding to the rear end portion 22 of the tubular casing. A plurality of impeller blades 32 are secured to the core 31 at the forward end and function to receive the unthreshed material and exert an axial rearward movement to it. There is a radially extending blade 33 for each of the impeller blades 32 extending the remaining length of the rotor. Each of the radially extending blades 33 is made up of a plurality of arms 34 that extend radially from the core 31 and terminate in free ends 35. A longitudinally extending member 36 is connected to the free ends 35 of the arms 34 forming an elongated edge of the radially extending blades. Each of the radially extending blades lies in a plane that passes through the fore-and-aft axis X—X. An open grate 37 is placed in each of the open spaces defined by the core 31, adjacent radially extending arms 34 and the longitudinally extending members. The rotor 30 is drivingly connected to the engine 17 by drive means 40. For a more complete disclosure of an axial flow combine reference should be made to the above referred to patent applications to Rowland-Hill et al., Ser. No. 576,151 filed on Aug. 30, 1966 and Knapp et al. Ser. No. 584,054 filed on Sept. 29, 1966.

A cob grinding mill 50 is provided along the rear end portion 22 of the tubular casing. As can be best seen in FIG. 3, a plurality of stationary spike teeth 51 protrude radially from the internal surface of the tubular casing. The spike teeth 51 are arranged to form a longitudinally aligned row on each side of the tubular casing. Each of the spike teeth 51 is slidably fitted into a guideway 52. A bar 53 having a threaded portion 54 is secured to each of the spike teeth 51 and extends longitudinally of the guideway 52. The outer end of the guideway 52 is closed by a plate 56 that rotatably supports a nut 55. The nut 55 receives the threaded portion 54 of the bar 53 to thereby permit adjustment of the spike teeth 51 radially with respect to the fore-and-aft axis X—X of the tubular casing. A plurality of rotating spike teeth 57 are secured to and protrude radially from the longitudinally extending members 36. The rotating spike teeth 57 are spaced from each other to form intermittent gaps 58 therebetween. Upon rotation of the elongated rotor 30, the stationary spike teeth 51 are received by the intermittent gaps 58 formed by the rotating spike teeth 57. The interaction between the stationary spike teeth 51 and the rotating spike teeth 57 functions to grind the cobs into the size of particles desired. The size of particles can be adjusted by axial adjustment of the stationary spike teeth 51 which is accomplished by rotation of the nut 55.

The conveying means 27 comprises a plurality of longitudinally arranged augers located below the tubular casing 20 such that all material passing through the bottom portion 24 will be collected by the conveying means 27. The conveying means 27 augers the collected material rearwardly and deposits it on the cleaning system 60. The cleaning system 60 is conventional and includes a clean grain trough 61 and a tailing trough 71. A portion of the material received by the cleaning system is carried away in the stream of air flowing through the cleaning system and is discharged to the atmosphere through the rear of the combine. Another portion of the material received by the cleaning system that is too dense to be carried away in the air stream is collected in the tailing trough 71. In a conventional combine these tailings are returned to the threshing section of the combine for reprocessing. A third portion of the material received by the cleaning system is the clean grain which is collected in the clean grain trough 61.

As seen in FIG. 2, the grain cracking means 65 are located such that the clean grain discharged from the cleaning system will encounter the grain cracking means 65 before reaching the clean grain trough 61. The grain cracking means are conventional and are shown in the form of a pair of drums having V-shaped serrations along their surface. One of the drums is stationary and the other drum is adjustable towards and away from the stationary drum to thus enable a selection in the coarseness of the cracked product. Reference may be made to the above referred to patents to Barkstrom et al. No. 3,348,780 and Johnson No. 3,384,138 for a more complete disclosure of grain cracking devices.

The tailing means 70 includes the tailings trough 71 and the tailings elevator 72. The tailings elevator 72 comprises an upwardly and forwardly extending conduit 73 having a conveyor 74 therein. In a conventional combine, the material collected in the tailings trough is augered to one end of the trough where it is deposited into the tailings elevator and raised towards the threshing section of the combine where it reenters the cycle for reprocessing. As is illustrated in FIG. 2, applicants have provided a perforated bottom plate 75 in the conduit 73. There is a chute 76 below the perforated bottom plate 75 that will collect any material passing through the perforated bottom plate and direct it into the clean grain trough 61. The size of the perforations in the plate 75 are such that particles of ground cob of a maximum desired size can pass through the plate and any particles of larger size continue up the tailings elevator and are fed into the tubular casing 20 for reprocessing. The perforated bottom plate 75 is designed such that it can be removed and replaced by other plates having perforations of different sizes so that ground cob particles fo any desired size can be obtained in the clean grain trough.

Referring now to FIG. 4 wherein there is disclosed a second embodiment of the cob grinding mill, in this embodiment the cob grinding mill is located along side of the tubular casing 20 and is arranged such that a chute 80 extends from the discharge opening 23 of the tubular casing to the cob grinding mill. Thus in this embodiment, the husks and kernels are removed from the cobs in the tubular casing 20, the kernels pass through the bottom portion 24, and the husks and cobs are discharged through the discharge opening 23 and move through the chute 80 into the cob grinding mill. The cob grinding mill of this embodiment includes a cylindrical casing 81 having a concentric cylindrical rotor 82 mounted for rotation therein. At the input end of the cob grinding mill, there are auger flightings 83 secured to the cylindrical rotor that functions as a cob and husk feeder to move the material axially of the cylindrical rotor. Midway along the cylindrical rotor, there is a conical portion forming a rotating burr member 84. The rotating burr member 84 is surrounded by an annular outer or stationary burr member 85. Interaction between these burr members 84 and 85 functions to grind the cobs to the desired size. A conical member 86 is located downstream of the burr members and has a plurality of ribs 87 formed thereon. The conical member 86 is surrounded by a conical shaped foraminous grate 88. Downstream of the conical member 86 there are a plurality of paddles 90 extending radially from the cylindrical rotor 82 that function to discharge any material in this area through a discharge opening 91 formed in the cylindrical casing 81.

The cobs and husks received by the cob mill are fed by the auger flightings 83 towards the cooperating rotating and stationary burrs 84 and 85 which function to grind the cobs into particles of the desired size. As the material continues to move axially, it passes between the conical member 86 and the foraminous grate 88 which functions to force any cob particles of a maximum desired size through the perforations in the foraminous grate. Because of the fiberous texture of the husks, the burr members 84 and 85 do not disintegrate the husks and they will not pass through the perforations in the grate 88. Thus the husks and any large particles of cobs that have failed to pass through the grate 88 encounter the paddles 90 which function to discharge this material to the atmosphere. A chute 89 is provided around the foraminous grate 88 that functions to gather the cob particles and direct them to the tialing trough 71.

What is claimed is:

1. In an axial-flow combine of the type having a tubular casing formed about a fore-and-aft axis and having a forward end through which unthreshed material is received and a bottom portion formed to permit the passage of selected material therethrough, said tubular casing having a rear end with a discharge opening formed therein, an elongated rotor journaled for rotation within said casing about said fore-and-aft axis, said rotor including a core and a plurality of arms extending radially therefrom, said arms terminating in free ends adjacent the internal surface of said tubular casing, groups of said radially extending arms lying in planes passing through said fore-and-aft axis, longitudinally extending members secured to said free ends of each of said groups, open grates connected to said rotor lying in said planes and occupying the space defined by the core, adjacent radially extending arms and the longitudinally extending members, said rotor having a forward end corresponding to the forward end of said tubular casing and a rear end corresponding to the rear end of said tubular casing, and means for diving said rotor in a given direction wherein the improvement comprises:

stationary spike teeth projecting from the internal surface of the rear end portion of said tubular casing, said stationary spike teeth spaced from each other to form a longitudinally aligned row;

a plurality of rotating spike teeth secured to and extending radially from the rear end portion of said longitudinally extending members, said rotating spike teeth being spaced longitudinally from each other forming intermittent gaps, said gaps adapted to receive the stationary spike teeth upon rotation of the rotor, such that the interaction between said stationary and rotating spike teeth functions to grind the corn cobs to a size that will pass through said bottom portion.

2. In an axial-flow combine of the type including a tubular casing having a front end and a rear end, spiral transport fins secured to said tubular casing along its upper internal surface and extending from said front end to said rear end, the lower surface of said tubular casing formed to permit the passage of selected material therethrough;

a rotor mounted for rotation within said tubular casing and extending from the front to the rear of said tubular casing, said rotor including, a core, impeller blades secured to the front end of said core, and a plurality of radially extending blades, said blades having elongated edges located adjacent the internal surface of the tubular casing.

and wherein the invention comprises: stationary spike teeth projecting from the internal surface of the rear end portion of said tubular casing, said stationary spike teeth spaced from each other to form a longitudinally aligned row, a plurality of rotating spike teeth secured to and extending radially from the rear end portion of said elongated edges, said rotating spike teeth being spaced longitudinally from each other forming intermittent gaps, said gaps, adapted to receive the stationary spike teeth upon rotation of the rotor, such that the interaction between said stationary and rotating spike teeth functions to grind the corn cobs to a size that will pass through said bottom portion.

3. The invention as set forth in claim 1 wherein said axial flow combine includes a cleaning system that functions to remove dust and fines and to separate the remaining material into clean grain and ground cobs;

conveying means below said tubular casing for collecting and feeding material that has passed through said bottom portion to said cleaning system;

a clean grain trough adjacent said cleaning system;

grain cracking means adapted to receive clean grain from said cleaning system, crack the grain and deposit the cracked grain in said clean grain trough;

tailing means adjacent said cleaning system for receiving and classifying the ground cobs, said tailing means further functioning to direct a selected class of the ground cobs to said clean grain trough.

4. The invention as set forth in claim 3 wherein said tailing means conveys the ground cobs, not directed to the clean grain trough, into the tubular casing of the combine for reprocessing.

5. The invention as set forth in claim 3 wherein said tailing means includes a tailing elevator that extends upwardly and forwardly, said tailing elevator including a conduit with a conveyor extending therethrough, a portion of said conduit having perforations formed therein, said perforations being of a size that will permit said selected class of ground cobs to pass therethrough.

6. The invention as set forth in claim 2 wherein said axial flow combine includes a cleaning system that functions to remove dust and fines and to separate the remaining material into clean grain and ground cobs;

conveying means below said tubular casing for collecting and feeding material that has passed through said bottom portion to said cleaning system;

a clean grain trough adjacent said cleaning system;

grain cracking means adapted to receive clean grain from said cleaning system, crack the grain and deposit the cracked grain in said clean grain trough;

tailing means adjacent said cleaning system for receiving and classifying the ground cobs, said tailing means further functioning to direct a selected class of said ground cobs to said clean grain trough.

7. The invention as set forth in claim 6 wherein said tailing means conveys the ground cobs, not directed to the clean grain trough, into the tubular casing of the combine for reprocessing.

8. The invention as set forth in claim 6 wherein said tailing means includes a tailing elevator that extends upwardly and forwardly, said tailing elevator including a conduit with a conveyor extending therethrough, a portion of said conduit having perforations formed therein, said perforations being of a size that will permit said selected class of ground cobs to pass therethrough.

9. In an axial flow combine including a tubular casing formed about a fore-and-aft axis and having a forward end through which unthreshed material is received and a bottom portion formed to permit the passage of selected material therethrough, said tubular casing having a rear end portion;

an elongated rotor journaled for rotation within said casing about said fore-and-aft axis, said rotor including a core and a plurality of arms extending radially therefrom, said arms terminating in free ends adjacent the internal surface of said tubular casing, groups of said radially extending arms lying in planes passing through said fore-and-aft axis, longitudinally extending members secured to said free ends of each of said groups, open grates connected to said rotor lying in said planes and occupying the space defined by the core, adjacent radially extending arms and the longitudinally extending members;

means for driving said rotor in a given direction;

a grain cleaning system including a tailing trough and a clean grain trough;

conveying means below said tubular casing for collecting and feeding material that has passed through said bottom portion to said cleaning system;

a cob grinding mill adjacent the rear end portion of said tubular casing and adapted to receive unground cobs therefrom, said cob grinding mill adapted to grind the cobs and deposit the ground cobs in said tailing trough;

a tailing elevator and classifier adapted to separate a portion of ground cobs of a selected size and convey the remaining material to the tubular casing for reprocessing, and means for depositing the separated portion of ground cobs into said clean grain trough.

10. The invention as set forth in claim 9 wherein grain cracking means is provided adjacent said cleaning system and is adapted to receive clean grain therefrom, crack the grain and deposit the cracked grain in said clean grain trough.

References Cited

UNITED STATES PATENTS

| 2,050,631 | 8/1936 | Schlayer | 130—27 |
| 2,853,247 | 9/1958 | Anderson. | |
| 3,348,780 | 10/1967 | Barkstrom et al. | 146—74 X |
| 3,464,419 | 9/1969 | Knapp et al. | 130—27 |

W. GRAYDON ABERCROMBE, Primary Examiner

U.S. Cl. X.R.

146—74, 76; 130—27